United States Patent [19]

Blaschke et al.

[11] Patent Number: 4,882,048

[45] Date of Patent: Nov. 21, 1989

[54] OPTICALLY ACTIVE ADSORBENTS

[75] Inventors: Gottfried Blaschke, Münster; Werner Fraenkel, Bad Rothenfelde; Werner Bröker, Münster; Joachim Kinkel, Guidental, all of Fed. Rep. of Germany

[73] Assignee: Merck Patent Gesellschaft Mit Beschränkter Haftung, Darmstadt, Fed. Rep. of Germany

[21] Appl. No.: 313,319

[22] Filed: Feb. 21, 1989

Related U.S. Application Data

[63] Continuation of Ser. No. 58,715, Jun. 5, 1987, abandoned.

[30] Foreign Application Priority Data

Jun. 7, 1986 [DE] Fed. Rep. of Germany ....... 3619303

[51] Int. Cl.$^4$ .............................................. B01D 15/08
[52] U.S. Cl. ........................... 210/198.2; 210/502.1; 502/401; 502/402
[58] Field of Search ................ 502/401, 402; 210/635, 210/656, 198.2, 502.1; 530/413, 417

[56] References Cited

U.S. PATENT DOCUMENTS

| | | | |
|---|---|---|---|
| 3,535,265 | 10/1970 | Baron | 502/402 |
| 4,111,863 | 9/1978 | Wulff | 210/510.1 |
| 4,127,730 | 11/1978 | Wulff | 210/510.1 |
| 4,138,542 | 2/1979 | Siegel | 525/218 |
| 4,156,765 | 5/1979 | Pohlemann | 210/635 |
| 4,194,051 | 3/1980 | Bachman | 562/470 |
| 4,324,681 | 4/1982 | House | 210/656 |
| 4,330,440 | 5/1982 | Ayers | 210/635 |
| 4,335,226 | 6/1982 | Muller | 210/656 |
| 4,415,631 | 11/1983 | Schutijser | 502/150 |
| 4,431,546 | 2/1984 | Hughes | 210/502.1 |
| 4,511,475 | 4/1985 | Yuki | 210/635 |
| 4,544,485 | 10/1985 | Pinkerton | 210/198.2 |
| 4,554,323 | 11/1985 | Yuki | 825/274 |
| 4,599,274 | 7/1986 | Ando | 156/327 |
| 4,627,919 | 12/1986 | Yuki | 210/656 |
| 4,658,000 | 4/1987 | Tyihak | 210/656 |
| 4,681,919 | 7/1987 | Yuki | 525/296 |
| 4,687,820 | 8/1987 | Hou | 210/656 |

FOREIGN PATENT DOCUMENTS

| | | | |
|---|---|---|---|
| 154343 | 9/1985 | European Pat. Off. | 502/402 |
| 155637 | 9/1985 | European Pat. Off. | 502/402 |
| 167488 | 1/1986 | European Pat. Off. | 210/656 |
| 2500523 | 7/1976 | Fed. Rep. of Germany | 210/198.2 |
| 2313073 | 11/1984 | Fed. Rep. of Germany | 210/198.2 |
| 61-74644 | 4/1986 | Japan | 502/402 |
| 61-77760 | 4/1986 | Japan | 502/401 |
| 61-87640 | 5/1986 | Japan | 210/635 |

OTHER PUBLICATIONS

Knox, "Performance and Selected Application of a New Range of Chemically Bonded Packing Materials in High-Performance Liquid Chromatography", Journal of Chromatography, vol. 112, 1975, pp. 171–188.

*Primary Examiner*—Ernest G. Therkorn
*Attorney, Agent, or Firm*—Millen, White & Zelano

[57] ABSTRACT

Absorbents based on optically active poly(meth)acrylamides, e.g. bonded to silica gel, can be used for separating racemic mixtures into their optical antipodes.

12 Claims, No Drawings

4,882,048

OPTICALLY ACTIVE ADSORBENTS

This application is a continuation of application Ser. No. 058,715, filed June 5, 1987, now abandoned.

BACKGROUND OF THE INVENTION

The separation of racemic mixtures into optical antipodes (enantiomers) represents a very important problem of preparative chemistry. In addition to the conventional methods of converting the racemic mixture into a mixture of diastereoisomers and separating them on the basis of different physical properties, interest has centered in recent years in the main on chromatographic methods for separating racemic mixtures, using in particular optically active adsorbents as the stationary phase.

The problem in particular is finding optically active adsorbents which permit the separation of a large number of chemically different racemates and hence are universally applicable.

It is known for example to polymerize optically active acrylamides and methacrylamides in the presence of a cross-linking agent in suspension, to let these cross linked polyamides swell in appropriate eluents and to use them for separating enantiomers (described in DEP 2,500,523). However, it is highly disadvantageous that these materials are only usable for low pressure liquid chromatography. Under pressures of greater than 5 bar, these crosslinked polyamides are compressed and become impermeable to the eluent, so that the rate of migration decreases significantly. Furthermore, their degree of swelling is dependent on the composition of the eluent. High pressure liquid chromatography of gradient solution is not possible on these gels.

SUMMARY OF THE INVENTION

It is therefore an object of the present invention to prepare and make available adsorbents which permit the separation of racemic mixtures of various structures with a high separation efficiency and which are universally also usable for high pressure liquid chromatography with gradient elution.

Upon further study of the specification and appended claims, further objects and advantages of this invention will become apparent to those skilled in the art.

It has now been found, surprisingly, that binding the optically active polyamides to a support such as silica gel produces particularly advantageous, optically active adsorbents for racemate splitting which are highly suitable for high pressure liquid chromatography and/or gradient elution.

The objects therefore have been satisfied by the provision of adsorbents based on optically active poly(-meth)acrylamides which can be used for separating racemic mixtures into their optical antipodes, wherein these amides are present bonded to, e.g., silica gel.

Such amides are obtainable for example from polymerizable compounds of the formula I $$CH_2=CR^1-CO-NR^2 \atop X \qquad \qquad I$$

in which $R^1$     is H or methyl,

 is an optically active secondary or tertiary amine or, bonded via the nitrogen, an optically active amino acid ester having up to 15 C atoms in the chain.

and $R^2$     is H or methyl.

These polymers, bonded to silica gel, can be used as adsorbents for separating racemic mixtures in particular in chromatography, preferably in high pressure chromatography.

The invention is not limited to these polyamides, however, and it is contemplated that any optically active polyamide may be used in accordance with the invention for the chromatographic separation of optical antipodes. The invention further provides adsorbents where the optically active acrylamides or methacrylamides are obtainable from polymerizable compounds of the formula I and wherein the optically active polyamides are attached to the silica gel directly or via (meth-)acryloyl groups.

The invention further provides a process for preparing optically active polymers, characterized in that the hydrophilic silica gel, which may be at least partially modified with (meth)acrylic acid, is reacted with optically active monomers of the formula I under conditions of polymerization reaction.

Finally, the invention also provides a process for the chromatographic separation of racemic mixtures into the optical antipodes with the use of the polymer bonded to silica gel according to the invention. In general it is possible to use any desired optically active acrylamide or methacrylamide as monomers. Preference, however, is given to the monomer of the formula I.

DETAILED DISCUSSION

The preferred monomers of the invention are those in which $R^1$ is H or methyl.

The group

is preferably an optically active secondary or tertiary amine. Such amines include for example, (S)-phenylethylamine, (S)-cyclohexylphenylmethylamine, (S)-naphthylethylamine, (S)-cyclohexylethylamine or (1S, 2R)-phenylcyclopropylamine. X then has preferably the structure of

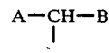

wherein A and B each are a ring component, e.g. phenyl, cyclopropyl, cyclohexyl, naphthyl, biphenyl, bicyclohexyl or cyclopentyl or an alkyl group having preferably 1-7 C-atoms with the proviso that A and B are not identical radicals.

The group

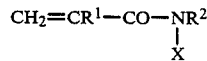

is further preferably an optically active amino acid ester with up to 15 C atoms in the amino acid group. Preferably the ester is an alkyl ester, more preferably a $C_{1-7}$ alkyl ester, in particular ethyl ester, and also an aryl ester, preferably a $C_{6-10}$ aryl ester. Particular preference is given for example to alkyl esters of (S)-phenylalanine, in particular the ethyl ester, and also for example to the esters of leucine or valine. The amino acid group preferably has 3-9 C-atoms $R^2$ is preferably H, not only in the amine but also in the amino acid derivatives.

It is possible to use both antipodes of the optically active compounds. It is also possible to use different monomers to prepare copolymers.

The monomers of the formula I are obtainable by conventional methods, for example by reacting ethyl (S)-phenylalaninate with acryloyl chloride or in general by reacting the optically active amines or amino acid ester

with methacylic acid or acrylic acid derivatives, preferably in the presence of a polymerization inhibitor such as 4-tertbutylpyrocatechol, at temperatures between about $-5°$ and $60°$ C. Advantageously the reaction is carried out at room temperature in the presence of an inert organic solvent, in particular a halohydrocarbon such as methylene chloride or chloroform. The reaction times are between about 30 minutes and 4 hours and essentially depend on the reaction temperature. The reaction conditions have been repeatedly described in the literature, e.g. in Houben-Weyl, Methoden der Organischem Chemie, Georg-Thieme-Verlag, Stuttgart.

Preferably the optically active polyamides are bonded to hydrophilic silica gels. Of these, preferred gel are those silica gels modified with diol, $NH_2$ or cyano groups. Particularly preferred are silica gels containing diol groups. Silica gels modified in this way are known, e.g. as in K. K. Unger, in Porous Silica, J. of Chrom. Library, Vol. 16, Elsevier, Amsterdam, 1979, p. 8, D. P. Herman et al. in J. of Chrom. Science, Vol. 19, 1981 or in DE-PS 23 13 073. These materials are commercially available. However, it is also possible to use other support materials, for example aluminum oxides or titanium oxides. such material are disclosed in, e.g. J. H. Knox et al., J. of Chrom., 112 (1975) 171-188.

To prepare these polyamides bonded to silica gel there are two preferred variants. First, a silica gel modified for example with diol groups can be esterified in a conventional manner with (meth)acrylic acid. The esterification is preferably carried out in an inert solvent, preferably for example dioxane or tetrahydrofuran, at temperatures between $-20°$ and $80°$ C., preferably at room temperature, and in general takes between 15 minutes and 48 hours. Preference is given to using a reactive derivative of (methy)acrylic acid, for example (meth)acrylic anhydride. This modification should be at least partial. Advantageously, the target degree of esterification should be over 50%, in particular over 70%. Loading of the silica gel with (meth) acrylate groups therefore yields a (meth)acrylate density of 0.5-4.0 $\mu mol/m^2$, in particular 2.0-3.0 $\mu mol/m^2$.

Subsequently the (meth)acrylate bonded to silica gel is copolymerized in suspension with a monomer of the formula I. The polymerization is carried out in a conventional manner in the presence of a free radical former, for example a peroxide such dibenzoyl peroxide, dilauroyl peroxide, di-o-tolyl peroxide, or an azo compound such as azobisisobutylronitrile. The reactants are suspended in an inert organic solvent, preferably an aromatic hydrocarbon such as benzene or toluene, or in a halohydrocarbon such methylene chloride, chloroform or 1,2-dichloroethane. The stirred mixture is heated under an inert gas atmosphere, preferably under nitrogen, to temperature between $+40°$ and $+100°$ C., preferably between $70°$ and $90°$. The polymerization time is between about 10 to 60 minutes, preferably between 15 to 30 minutes. The polymerization is discontinued by adding an inhibitor, for example tertbutylpryocatechol. The polyamide obtained in this way, which is bonded covalently to the silica gel, is separated off by filtration, thoroughly washed and dried in vacuum.

In the same way it is possible to react in place of a diol-modified silicon gel an amino-modified silica gel with a (meth)acrylic acid derivative and to subject the product to copolymerization with monomeric (meth)acrylamides. The materials obtained are likewise suitable for enantiomer separation.

In another process variant, hydrophilic silica gel is reacted directly with monomers of the formula I under conventional polymerization conditions. The result is likewise an attachment of the polyamides to the silica gel, and the materials obtained are likewise suitable for direct enantiomer separation by means of high pressure liquid chromatography. The polymerization reaction in this variation of the process may be carried out substantially as described above.

The ratio of silica gel:monomer (in parts by weight) can be varied in the reactions described between about 1:0.05 and 1:10, preferably within the range from 1:0.1 and 1:0.5, being in particular 1:0.25.

The loading of the silica gel with poly(meth)acrylamides therefore yields a poly(methyl)acrylamide density within the range of 0.5-8.0 $\mu mol/m^2$, preferably within 2.0-4.0 $\mu mol/m^2$.

The materials according to the invention permit the separation of racemic mixtures in high optical yields by means of high pressure liquid chromatography, which is impossible with polymers which are not attached to the silica gel. The method of high pressure liquid chromatography for the preparative separation of racemic mixtures into their optical antipodes is familiar to those skilled in the art. Customarily, the adsorbent is suspended in the eluent and packed under pressure into steel columns by means of a filling apparatus. The racemate to be separated, in the form of a solution in an appropriate eluent, in introduced into the column. Finally, this is followed by elution with eluents, optionally with gradient elution, at a certain flow rate and by detection. The eluents used are advantageously hydrocarbons, in particular aromatic hydrocarbons, and ethers of mixtures thereof. Mixtures of dioxane and hexane are particularly suitable.

The advantages of enantiomer separations which are carried out by means of high pressure liquid chromatography using the adsorbent according to the invention lie, compared with separation over nonattached polymers by means of low pressure liquid chromatography, in a significantly shorter separating time and higher separating efficiency. By means of the polymers according to the invention it is possible to carry out separation of racemates of a great many classes of compounds.

In what follows, preparation and separation examples will illustrate the polymers according to the invention in more detail.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all application, patents and publications, if any, cited above and below are hereby incorporated by reference.

EXAMPLE 1 a. A solution of 1.5 g of methacrylic anhydride in 10 ml of dioxane and 0.8 g of diisopropylethylamine in 30 ml of dioxane is added to a suspension of 2.5 g of diol phase (silica gel LiChrosorb® Diol 5 μm, E. Merck), in 20 ml of dioxane in a nitrogen stream, the mixture is stirred at room temperature for 30 minutes, is allowed to stand for 24 hours, is filtered off with suction, washed with dioxane and dried. This gives a white product (C=8.27%, H=1.76%).

b. A solution of 7.5 g of (S)-N-acryloylphenylalanine ethyl ester in 20 ml of toluene and a solution of 22 mg of azobisisobutylronitrile in 10 ml of toluene are added under nitrogen to a suspension of 2.5 g of the silica gel methacrylate prepared as in Example 1a in 10 ml of toluene, and the mixture is maintained at 80° C. with stirring for 15 minutes. The polymerization is discontinued by adding a solution of 200 mg of tert-butylpyrocatechol in 10 ml of toluene, which is followed by filtering, washing and drying. This gives 3.0 g of a white adsorbent (C=21.35%, H=3.1%, N=1.16%) which has a loading of about 20% by weight of polyacrylamide.

EXAMPLE 2

By the method of Example 1b, silica gel methacrylate (prepared in accordance with Example 1a) and (S)-phenylethylmethylacrylamide are reacted to prepare the corresponding silica gel polymethacrylamide, except that the polymerization time is 30 minutes.

In the same way (S)-cyclohexylethylmethacrylamide and silica gel methacrylate are used to prepare a silica gel (S)-cyclohexylethylpolymethacrylamide.

EXAMPLE 3

A suspension of 2.5 g of silica gel (LiChrosorb® Diol 5 μm, E. Merck) is heated with stirring in a nitrogen atmosphere in a solution of 7.5 g of (S)-N-acryloylphenylalanine ethyl ester and 22 mg of azobisisobutyronitrile in 40 ml of toluene at 80° C. for 15 minutes, the reaction is discontinued, and the product is washed and dried. The result obtained is 2.8 g of a white adsorbent (C=12.48%, H=2.06%, N=0.65%).

EXAMPLE 4

A suspension of 5.0 g of silica gel (LiChrosorb® Diol 5 μm, E. Merck) is heated with stirring in a nitrogen atmosphere in a solution of 1.25 g of (S)-acryloylphenylalanine ethyl ester and 44 mg of azobisisobutylronitrile in 100 ml of cyclohexane at 80° C. for 15 minutes, the reaction is discontinued, and the product is washed and dried.

EXAMPLE A

The adsorbents are introduced in the form of a suspension in 30 ml of isopropanol into steel columns (250×4 mm) under a pressure of 450–500 bar.

In each case μg solutions of 3–15 ug of a racemate in dioxane are chromatographed at a rate of migration of 0.5–2.0 ml, a pressure of 20–100 bar becoming established depending on eluent and rate of migration. Detection is effected with a flow cell at 254 nm.

The table below shows the results of the chromatographic separation tests on various racemates.

| Adsorbent | Racement | Eluent n—hexane/ dioxane | Flow ml/min. | Elution volume of enantiomers (ml) | |
|---|---|---|---|---|---|
| A | Oxazepam | 75:25 | 1.0 | 51.8 | 55.8 |
| A | Oxazolam | 80:20 | 0.5 | 12.3/ 13.8 | 15.9/ 18.3 (diast.) |
| A | Penflutizide | 53:47 | 1.5 | 41.4 | 46.8 |
| B | N—desmethyl-chlormezanone | 65:35 | 1.0 | 35.4 | 43.8 |
| B | Cyclopenthiazide | 40:60 | 2.0 | 54.9 | 86.7 |
| C | Thalidomide | 75:25 | 1.0 | 17.1 | 23.4 |
| C | Acenocomarol | 75:25 | 1.0 | 34.2 | 39.0 |
| D | Lopirazepam | 50:50 | 1.0 | 40.8 | 49.2 |
| D | Chlormezanone | 75:25 | 1.0 | 19.8 | 23.4 |
| D | Chlorthalidone | 55:45 | 0.7 | 30.2 | 36.1 |

From these results it is clear that the materials according to the invention are highly suitable for enantiomer separation by means of high pressure liquid chromatography. The elution volumes of the enantiomers are sufficiently wide apart, and generally very good base line separation is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An absorbent useful for chromatographic separation of enantiomeric compounds, comprising an optically active poly(meth)acrylamide bonded to a chromatographic support material, prepared by a process consisting essentially of reacting under polymerization conditions a chromatographic support material or a hydrophilically modified chromatographic support material, with an optically active monomer of the formula $$CH_2=CR^1-CO-NR^2$$
$$|$$
$$X$$

wherein
$R^1$ is H or methyl,
$R^2$ is H or methyl, and
$-NR^2$ is (a) an optically active secondary or tertiary amine residue or $$NR^2$$
$$|$$
$$X$$

is (b) an optically active amino acid ester bonded via the nitrogen and having up to 15 C atoms in the main chain to yield an absorbent wherein the optically active poly(meth)acrylamide is attached to the chromatographic support material directly or via (meth)acryloxyl groups.

2. An adsorbent according to claim 1, wherein the chromatographic support material is silica gel.

3. An adsorbent according to claim 1 wherein $$-NR^2$$
$$|$$
$$X$$

is (a) an optically active secondary or tertiary amine residue wherein X is a group $$A-CH-B,$$
$$|$$

wherein A and B each are phenyl, cyclopropyl, cyclohexyl, naphthyl, biphenyl, bicyclohexyl or cyclopentyl or an alkyl group having 1-7 C-atoms with the proviso that A and B are not identical radicals.

4. An adsorbent according to claim 1, wherein the chromatographic support material is hydrophilically modified with diol, $NH_2$ or cyano groups.

5. An adsorbent according to claim 4, wherein the chromatographic support material is hydrophilically modified with diol groups.

6. An adsorbent according to claim 5, wherein the chromatographic support material is silica gel.

7. An adsorbent according to claim 4, wherein the chromatographic support material is silica gel.

8. An adsorbent according to claim 1, wherein $R^2$ is hydrogen.

9. An adsorbent according to claim 1, wherein $$-NR^2$$
$$|$$
$$X$$

is (S)-phenylethylamine, (S)cyclohexylphenylmethylamine, (S)-cyclohexylethylamine or (1S,2R)-phenylcyclopropylamine.

10. An adsorbent according to claim 1, wherein the amino acid ester is a $C_{1-7}$-alkyl ester of a $C_{6-10}$-aryl ester.

11. An adsorbent according to claim 1, wherein $$NR^2$$
$$|$$
$$X$$

is an optically active amino acid ethyl ester.

12. An adsorbent according to claim 11, wherein the amino acid is (S)-phenylalanine, leucine or valine.

* * * * *

UNITED STATES PATENT AND TRADEMARK OFFICE
CERTIFICATE OF CORRECTION

PATENT NO. : 4,882,048

DATED : November 21, 1989

INVENTOR(S) : GOTTFRIED BLASCHKE ET AL

It is certified that error appears in the above-identified patent and that said Letters Patent is hereby corrected as shown below:

Title page, inventors, third inventors name:

reads "Werner Bröker"

should read --Werner Broeker--

Signed and Sealed this

Nineteenth Day of February, 1991

Attest:

HARRY F. MANBECK, JR.

*Attesting Officer*      *Commissioner of Patents and Trademarks*